United States Patent
Natori

(10) Patent No.: US 12,180,392 B2
(45) Date of Patent: Dec. 31, 2024

(54) THERMAL- AND UV-CURING ADHESIVE COMPOSITION

(71) Applicant: Henkel AG & Co. KGaA, Duesseldorf (DE)

(72) Inventor: Toshiki Natori, Kanagawa (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 202 days.

(21) Appl. No.: 17/745,208

(22) Filed: May 16, 2022

(65) Prior Publication Data

US 2022/0325152 A1    Oct. 13, 2022

Related U.S. Application Data

(63) Continuation of application No. PCT/JP2020/042530, filed on Nov. 13, 2020.

(30) Foreign Application Priority Data

Nov. 15, 2019    (JP) .................... 2019-207335

(51) Int. Cl.
| | | |
|---|---|---|
| C09J 175/04 | (2006.01) | |
| C09J 7/10 | (2018.01) | |
| C09J 11/04 | (2006.01) | |
| C09J 133/06 | (2006.01) | |

(52) U.S. Cl.
CPC .............. C09J 175/04 (2013.01); C09J 7/10 (2018.01); C09J 11/04 (2013.01); C09J 133/068 (2013.01); C09J 2203/326 (2013.01); C09J 2301/408 (2020.08); C09J 2301/416 (2020.08)

(58) Field of Classification Search
USPC ..................................... 522/96, 97
See application file for complete search history.

(56) References Cited

U.S. PATENT DOCUMENTS

| | | | | |
|---|---|---|---|---|
| 5,498,782 A | * | 3/1996 | Rex ..................... | C08F 290/067 522/90 |
| 7,211,368 B2 | * | 5/2007 | Coats ..................... | B33Y 10/00 526/261 |
| 2007/0160370 A1 | | 7/2007 | Kikuchi et al. | |
| 2009/0018231 A1 | * | 1/2009 | Fink ..................... | C08G 18/792 522/96 |
| 2010/0297453 A1 | | 11/2010 | Maenaka et al. | |
| 2011/0021655 A1 | * | 1/2011 | Smothers .................... | C09J 4/00 522/63 |
| 2015/0024218 A1 | | 1/2015 | Koga et al. | |
| 2015/0130878 A1 | * | 5/2015 | Kohzuki .............. | C09D 175/08 347/85 |
| 2016/0300810 A1 | | 10/2016 | Kanamori et al. | |
| 2020/0299474 A1 | * | 9/2020 | Tsukao ..................... | C08J 7/042 |

FOREIGN PATENT DOCUMENTS

| | | | | |
|---|---|---|---|---|
| CN | 101796106 A | | 8/2010 | |
| CN | 101939391 A | | 1/2011 | |
| CN | 102850727 A | | 1/2013 | |
| CN | 104169388 A | | 11/2014 | |
| CN | 105745274 A | | 7/2016 | |
| CN | 109233648 | | 1/2019 | |
| CN | 111670231 A | * | 9/2020 | ............ C09J 163/00 |
| EP | 2742108 | | 6/2014 | |
| EP | 2742108 A1 | | 6/2014 | |
| JP | 2003147321 A | | 5/2003 | |
| JP | 2006342222 A | * | 12/2006 | |
| JP | 2007184801 A | | 7/2007 | |
| JP | 2014189572 A | * | 10/2014 | |
| JP | 2014201688 A | * | 10/2014 | |
| JP | 2015023331 A | | 2/2015 | |
| JP | 2015091905 A | * | 5/2015 | |
| JP | 2016102919 A | * | 6/2016 | |
| JP | 2017014396 A | * | 1/2017 | |
| JP | 6219058 B2 | * | 10/2017 | |
| TW | 201636404 A | * | 10/2016 | |
| TW | I845643 | * | 6/2024 | |
| WO | 2009086492 A1 | | 7/2009 | |
| WO | WO-2012029905 A1 | * | 3/2012 | ............ B32B 27/08 |
| WO | 2019163629 | | 8/2019 | |
| WO | 2019185260 | | 10/2019 | |
| WO | WO-2020085166 A1 | * | 4/2020 | ........... B29C 64/124 |

OTHER PUBLICATIONS

International Search Report issued in connection with International Application No. PCT/JP2020/042530 mailed on Feb. 22, 2021.

\* cited by examiner

*Primary Examiner* — Sanza L. McClendon
(74) *Attorney, Agent, or Firm* — Steven C. Bauman

(57) ABSTRACT

Provided is an adhesive that is resistant to peeling off during heat-curing when a lens holder is adhered to a substrate having an image sensor fixed thereon in assembling a camera module, and that has excellent thermal durability after being cured. A thermal- and UV-curing adhesive composition contains (a) at least one urethane acrylate oligomer containing at least one polycarbonate-based urethane acrylate oligomer, (b) at least one acrylate monomer, (c) at least one particulate rubber, (d) at least one polyamine curing agent having a primary amine and/or a secondary amine, and (e) at least one photopolymerization initiator, wherein the at least one urethane acrylate oligomer (a) has a weight average molecular weight of 4,000 or more, and the at least one particulate rubber (c) is present in an amount of 5% by weight or more in the entire composition.

8 Claims, 1 Drawing Sheet

THERMAL- AND UV-CURING ADHESIVE COMPOSITION

TECHNICAL FIELD

The present invention relates to thermal- and UV-curing adhesive compositions.

BACKGROUND

A compact camera module equipped in devices such as a smartphone includes a lens, a cylindrical lens holder for holding the lens, and an image sensor that is fixed on a substrate and that converts the light collected by the lens into an electrical signal. In the assembly of such a compact camera module, the lens holder and the substrate having an image sensor fixed thereon must be firmly adhered to each other, and a thermal-curing adhesive is used for adhering them (PTL 1).

When the lens holder is adhered to the substrate having an image sensor fixed thereon, the distance between the lens and the image sensor must be accurately maintained. Specifically, the distance between the lens and the light-receiving surface of the image sensor must match the focal point distance of the lens. However, the use of such a thermal-curing adhesive results in a change in the distance between the lens and the image sensor during heat-curing.

To solve this problem, PTL 2 suggests an adhesive that is cured by ultraviolet rays and heat. The use of such a thermal- and UV-curing adhesive can precisely fix the distance between the lens and the image sensor by performing UV irradiation before a heat-curing step that is likely to cause the positional shift.

PATENT LITERATURE

JP2007-184801A
JP2017-101112A

SUMMARY OF INVENTION

Technical Problem

Materials with a high coefficient of thermal expansion (CTE), such as polycarbonates, are widely used as the materials of the lens holder. The present inventor found that a conventional thermal- and UV-curing adhesive peels off during heat-curing, or loses its thermal durability, due to the big difference in coefficient of thermal expansion between the lens holder and the substrate.

An object of the present invention is to provide an adhesive that is resistant to peeling off during heat-curing when a lens holder is adhered to a substrate having an image sensor fixed thereon in assembling a camera module; and that has excellent thermal durability after being cured.

Solution to Problem

The present inventor conducted extensive research to achieve the object, and found that the object is achieved by the use of a thermal- and UV-curing adhesive composition that contains (a) at least one urethane acrylate oligomer containing at least one polycarbonate-based urethane acrylate oligomer, (b) at least one acrylate monomer, (c) at least one particulate rubber, (d) at least one polyamine curing agent having a primary amine and/or a secondary amine, and (e) at least one photopolymerization initiator, wherein the at least one urethane acrylate oligomer (a) has a weight average molecular weight of 4,000 or more, and the at least one particulate rubber (c) is present in an amount of 5% by weight or more in the entire composition. The present invention was completed by conducting further research on this finding. The present invention includes the following embodiments.

Item 1.

A thermal- and UV-curing adhesive composition, comprising
(a) at least one urethane acrylate oligomer comprising at least one polycarbonate-based urethane acrylate oligomer,
(b) at least one acrylate monomer,
(c) at least one particulate rubber,
(d) at least one polyamine curing agent having a primary amine and/or a secondary amine, and
(e) at least one photopolymerization initiator,
wherein the at least one urethane acrylate oligomer (a) has a weight average molecular weight of 4,000 or more, and
the at least one particulate rubber (c) is present in an amount of 5% by weight or more in the entire composition.

Item 2.

The thermal- and UV-curing adhesive composition according to Item 1, wherein the at least one urethane acrylate oligomer (a) contains the at least one polycarbonate-based urethane acrylate oligomer in an amount of 50% by weight or more based on a total of the at least one urethane acrylate oligomer.

Item 3.

The thermal- and UV-curing adhesive composition according to Item 1 or 2, wherein the at least one particulate rubber (C) is a core-shell type particulate rubber.

Item 4.

The thermal- and UV-curing adhesive composition according to any one of Items 1 to 3, further comprising
(f) at least one chain transfer agent.

Item 5.

The thermal- and UV-curing adhesive composition according to any one of Items 1 to 4, further comprising
(g) at least one inorganic filler.

Item 6.

The thermal- and UV-curing adhesive composition according to any one of Items 1 to 5, for use in assembling a camera module.

Item 7.

Use of a thermal- and UV-curing adhesive composition in assembling a camera module, the thermal- and UV-curing adhesive composition comprising
(a) at least one urethane acrylate oligomer comprising at least one polycarbonate-based urethane acrylate oligomer,
(b) at least one acrylate monomer,
(c) at least one particulate rubber,
(d) at least one polyamine curing agent having a primary amine and/or a secondary amine, and
(e) at least one photopolymerization initiator,
wherein the at least one urethane acrylate oligomer (a) has a weight average molecular weight of 4,000 or more, and
the at least one particulate rubber (c) is present in an amount of 5% by weight or more in the entire composition.

Item 8.

A method of adhering a lens holder for a camera module to a camera module substrate having an image sensor fixed thereon, the method comprising adhering the lens holder to the substrate by using a thermal- and UV-curing adhesive composition, wherein the thermal- and UV-curing adhesive composition comprises
(a) at least one urethane acrylate oligomer comprising at least one polycarbonate-based urethane acrylate oligomer,
(b) at least one acrylate monomer,
(c) at least one particulate rubber,
(d) at least one polyamine curing agent having a primary amine and/or a secondary amine, and
(e) at least one photopolymerization initiator,
wherein the at least one urethane acrylate oligomer (a) has a weight average molecular weight of 4,000 or more, and
the at least one particulate rubber (c) is present in an amount of 5% by weight or more in the entire composition.

Advantageous Effects of Invention

In assembling a camera module, the use of the thermal- and UV-curing adhesive composition according to the present invention to adhere a lens holder to a substrate having an image sensor fixed thereon leads to reduced occurrence of peeling in the adhesive during heat-curing, and improved thermal durability after curing.

DESCRIPTION OF EMBODIMENTS

Figure 1:
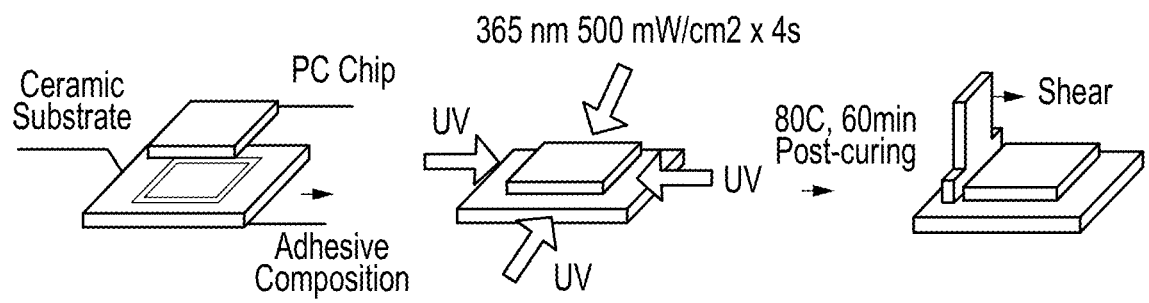
FIG. 1 is a diagram that illustrates an adhesion test performed in the Examples.
Figure 2:
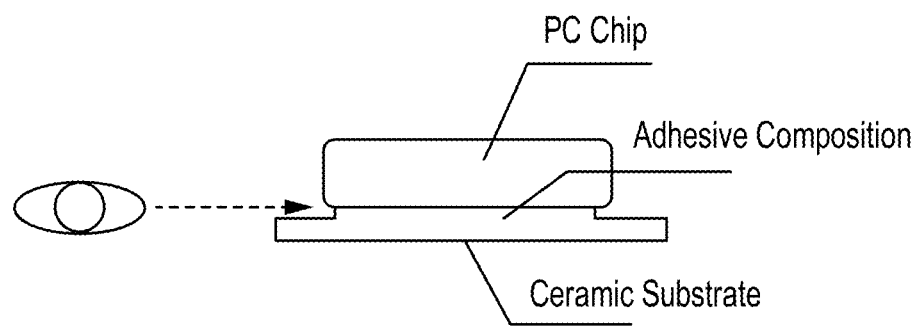
FIG. 2 is a diagram that illustrates a peeling test performed in the Examples.

In the present specification, "weight average molecular weight" ($M_w$) refers to a value determined as a polystyrene equivalent value by gel permeation chromatography (GPC) using a solvent such as tetrahydrofuran as an eluent.

In this specification, (meth)acrylate, (meth)acrylic, and (meth)acryloyl group respectively refer to acrylate or methacrylate; acrylic or methacrylic; and acryloyl group or methacryloyl group.

(a) Urethane Acrylate Oligomer

Urethane acrylate oligomers are widely known among those skilled in the art. A urethane acrylate oligomer can be obtained, for example, by reacting a diisocyanate, preferably an aliphatic diisocyanate, with a hydroxy acrylate. Alternatively, a urethane acrylate oligomer can be obtained, for example, by reacting a diisocyanate, preferably an aliphatic diisocyanate, a hydroxy acrylate, and a polyol.

The at least one urethane acrylate oligomer (a) contains at least one polycarbonate-based urethane acrylate oligomer. Polycarbonate-based urethane acrylate oligomers are widely known among those skilled in the art. A polycarbonate-based urethane acrylate oligomer can be obtained, for example, by reacting a diisocyanate, preferably an aliphatic diisocyanate, a hydroxy acrylate, and a polycarbonate.

The at least one urethane acrylate oligomer (a) contains at least one polycarbonate-based urethane acrylate oligomer in an amount of preferably 50% by weight or more, and more preferably 60% by weight or more, based on the total of the at least one urethane acrylate oligomer. The at least one urethane acrylate oligomer for use in the present invention may consist of at least one polycarbonate-based urethane acrylate oligomer. Specific examples of polycarbonate-based urethane acrylate oligomers for use include UN9200A (Negami Chemical Industrial Co., Ltd.; weight average molecular weight 15,000) and UV3310B (Mitsubishi Chemical Corporation; weight average molecular weight 5,000).

The at least one urethane acrylate oligomer (a) may further contain at least one polyether-based urethane acrylate oligomer. Polyether-based urethane acrylate oligomers are widely known among those skilled in the art. A polyether-based urethane acrylate oligomer can be obtained, for example, by reacting a diisocyanate, preferably an aliphatic diisocyanate, a hydroxy acrylate, and a polyether. Specific examples of polyether-based urethane acrylate oligomers for use include UV6640B (Mitsubishi Chemical Corporation; weight average molecular weight 5,000) and UN6202 (Negami Chemical Industrial Co., Ltd.; weight average molecular weight 11,000).

The at least one urethane acrylate oligomer (a) has a weight average molecular weight of 4,000 or more.

The at least one urethane acrylate oligomer (a) has a weight average molecular weight of preferably 5,000 or more, more preferably 6,000 or more, still more preferably 8,000 or more, and yet still more preferably 10,000 or more, from the standpoint of ensuring excellent durability under thermal and mechanical stimulation and appropriate storage modulus by sufficiently forming a soft segment structure in a cured product. The at least one urethane acrylate oligomer (a) has a weight average molecular weight of preferably 20,000 or less, more preferably 18,000 or less, and still more preferably 16,000 or less, from the standpoint of dispensability of the adhesive.

The thermal- and UV-curing adhesive composition according to the present invention contains the at least one urethane acrylate oligomer (a) in a total amount of preferably 10% by weight or more, and more preferably 15% by weight or more based on the entire composition, from the standpoint of elastic modulus control after curing and adhesiveness. The thermal- and UV-curing adhesive composition according to the present invention contains the at least one urethane acrylate oligomer (a) in a total amount of preferably 40% by weight or less, and more preferably 30% by weight or less based on the entire composition, from the standpoint of elastic modulus control after curing, dispensability, and adhesiveness.

The at least one urethane acrylate oligomer (a) has a glass transition temperature (Tg) of preferably 25° C. or less, from the standpoint of the elastic modulus of a cured product and adhesiveness. In particular, the polycarbonate-based urethane acrylate oligomer has a glass transition temperature of more preferably 10° C. or less.

(b) Acrylate Monomer

The thermal- and UV-curing adhesive composition according to the present invention further comprises at least one acrylate monomer (b). The at least one acrylate monomer (b) may be a monofunctional (meth)acrylic acid ester, or a polyfunctional (meth)acrylic acid ester.

Specific examples of monofunctional methacrylic acid esters include methyl methacrylate, ethyl methacrylate, n-propyl methacrylate, glycidyl methacrylate, 2-hydroxyethyl methacrylate, 2-isocyanatoethyl methacrylate, isobornyl methacrylate (e.g., "IBXA," Osaka Organic Chemical Industry Ltd.), 2-methacryloxyethyl trimethoxysilane, 2-methacryloxyethyl triethoxysilane, 3-methacryloxypropyl trimethoxysilane, 3-methacryloxypropyl methyl dimethoxy silane, 3-methacryloxypropyl triethoxysilane, 3-methacryloxymethyl diethoxysilane, 4-methacryloxybutyl trimethoxysilane, 4-methacryloxybutyl triethoxysilane, dicyclopentenyloxyethyl methacrylate (e.g., FA-512M, produced by Hitachi Chemical Co., Ltd.), dicyclopentanyl methacrylate (e.g., FA-513M, produced by Hitachi Chemical Co., Ltd.), pentamethyl piperidyl methacrylate (e.g., FA-711MM, produced by Hitachi Chemical Co., Ltd.), tetramethyl piperidyl methacrylate (e.g., FA-712HM, produced by Hitachi Chemical Co., Ltd.), methoxypolyethylene glycol methacrylate (e.g., produced by Hitachi Chemical Co., Ltd.), benzyl methacrylate (e.g., FA-BZM, produced by Hitachi Chemical Co., Ltd.), 2-hydroxy-3-acryloyloxypropyl methacrylate (e.g., Light Ester G-201P, produced by Kyoeisha Chemical Co., Ltd.), 2-methacryloyloxyethyl phthalate (e.g., CB-1, produced by Shin-Nakamura Chemical Co., Ltd.), methoxypolyethylene glycol methacrylate, phenoxyethylene glycol methacrylate (e.g., PHE-1G, produced by Shin-Nakamura Chemical Co., Ltd.), stearyl methacrylate (e.g., S, produced by Shin-Nakamura Chemical Co., Ltd.), 2-methacryloyloxyethyl succinate (e.g., SA, produced by Shin-Nakamura Chemical Co., Ltd.), and 3,4-epoxycyclohexylmethyl methacrylate (e.g., Cyclomer M100, produced by Daicel Corporation).

Specific examples of difunctional methacrylic acid esters include dipropylene glycol diacrylate (e.g., APG-100, Shin-Nakamura Chemical Co., Ltd.), tricyclodecane dimethanol diacrylate (e.g., A-DCP, Shin-Nakamura Chemical Co., Ltd.), 1,4-butanediol dimethacrylate (e.g., FA-124M, produced by Hitachi Chemical Co., td.), neopentyl glycol dimethacrylate (e.g., FA-125M, produced by Hitachi Chemical Co., Ltd.), polyethylene glycol #200 dimethacrylate (e.g., FA-220M, produced by Hitachi Chemical Co., Ltd.), EO-modified bisphenol A dimethacrylate (e.g., FA-321M, produced by Hitachi Chemical Co., Ltd.), EO-modified polypropylene glycol #700 dimethacrylate (e.g., FA-023M, produced by Hitachi Chemical Co., Ltd.), ethylene glycol dimethacrylate (e.g., 1G, produced by Shin-Nakamura Chemical Co., Ltd.), diethylene glycol dimethacrylate (e.g., 2G, produced by Shin-Nakamura Chemical Co., Ltd.), triethylene glycol dimethacrylate (e.g., 3G, produced by Shin-Nakamura Chemical Co., Ltd.), polyethylene glycol dimethacrylate (e.g., produced by Shin-Nakamura Chemical Co., Ltd.), 2,2-bis[4-(methacryloxyethoxy)phenyl]propane (e.g., BPE-80N, produced by Shin-Nakamura Chemical Co., Ltd.), ethoxylated bisphenol A dimethacrylate (e.g., produced by Shin-Nakamura Chemical Co., Ltd.), tricyclodecane dimethanol dimethacrylate (e.g., DCP, produced by Shin-Nakamura Chemical Co., Ltd.), 1,10-decanediol dimethacrylate (e.g., DOD-N, produced by Shin-Nakamura Chemical Co., Ltd.), 1,6-hexanediol dimethacrylate (e.g., HD-N, produced by Shin-Nakamura Chemical Co., Ltd.), 1,9-nonanediol dimethacrylate (e.g., NOD-N, produced by Shin-Nakamura Chemical Co., Ltd.), neopentylglycol dimethacrylate (e.g., NPG, produced by Shin-Nakamura Chemical Co., Ltd.), ethoxylated polypropylene glycol dimethacrylate (e.g., produced by Shin-Nakamura Chemical Co., Ltd.), glycerol dimethacrylate (e.g., 701, produced by Shin-Nakamura Chemical Co., Ltd.), and polypropylene glycol dimethacrylate (e.g., produced by Shin-Nakamura Chemical Co., Ltd.).

Specific examples of polyfunctional (trifunctional or higher functional) methacrylates include trimethylolpropane trimethacrylate (e.g., TMPT, produced by Shin-Nakamura Chemical Co., Ltd.).

The thermal- and UV-curing adhesive composition according to the present invention may comprise only a single acrylate monomer (b), or two or more acrylate monomers (b).

The thermal- and UV-curing adhesive composition according to the present invention comprises at least one acrylate monomer (b) in a total amount of preferably 10% by weight or more, and more preferably 15% by weight or more based on the entire composition, from the standpoint of excellent UV curability and crosslink density control. The thermal- and UV-curing adhesive composition according to the present invention comprises the at least one urethane acrylate oligomer (a) in a total amount of preferably 40% by weight or less, and more preferably 30% by weight or less based on the entire composition, from the standpoint of elastic modulus control after curing, dispensability, and adhesiveness.

(c) Particulate Rubber

The at least one particulate rubber (c) is added to eliminate the mismatch in coefficient of thermal expansion between the surface of a substrate and the adhesive. This can prevent, for example, the adhesive from peeling off or cracking due to a thermal and/or physical impact.

The at least one particulate rubber (c) is preferably a core-shell type particulate rubber. The material of the particulate rubber can be any material. For example, a widely used styrene-butadiene rubber may be used in the core part.

The thermal- and UV-curing adhesive composition according to the present invention may comprise only a single particulate rubber (c), or two or more particulate rubbers (c).

The thermal- and UV-curing adhesive composition according to the present invention comprises the at least one particulate rubber (c) in an amount of preferably 3% by weight or more, and more preferably 4% by weight or more based on the entire composition, from the standpoint of eliminating the mismatch in coefficient of thermal expansion between the surface of a substrate and the adhesive. The thermal- and UV-curing adhesive composition according to the present invention comprises the at least one particulate rubber (c) in an amount of preferably 20% by weight or less, more preferably 15% by weight or less, and still more preferably 10% by weight or less based on the entire composition.

(d) Polyamine Curing Agent Having a Primary Amine and/or a Secondary Amine

The at least one polyamine curing agent (d) is a polyamine-based heat-curing agent having a primary amine and/or a secondary amine.

The at least one polyamine curing agent (d) preferably has a melting point of 50° C. or more, and more preferably 60° C. or more, from the standpoint of prolonged product lifetime. The at least one polyamine curing agent (d) has a melting point of 80° C. or less, and more preferably 70° C. or less from the standpoint of sufficient thermosetting properties at a normal thermosetting temperature (typically 80° C.).

Specific examples of polyamine-based heat-curing agents having a primary amine and/or a secondary amine include Fujicure FXR-1020, FXR-1030, FXR-1050, and FXR-1080 (all produced by Fuji Kasei Kogyo K.K.); and Adeka Hardener EH-43575, EH-5030S, EH-5057 PK, and EH-5057 PK (all produced by ADEKA Corporation.

The thermal- and UV-curing adhesive composition according to the present invention may comprise a single polyamine curing agent (d), or two or more polyamine curing agents (d).

The thermal- and UV-curing adhesive composition according to the present invention comprises the at least one polyamine curing agent (d) in an amount of preferably 10% by weight or more, and more preferably 20% by weight or more based on the entire composition, from the standpoint of excellent adhesion and sufficient addition reaction between acrylate monomers and oligomers. The thermal- and UV-curing adhesive composition according to the present invention comprises the at least one polyamine curing agent (d) in an amount of preferably 40% by weight or less, and more preferably 30% by weight or less based on the entire composition, from the standpoint of excellent moisture resistance and dispensability.

(e) Photopolymerization Initiator

The at least one photopolymerization initiator (e) can be any photopolymerization initiator, and the at least one photopolymerization initiator (e) for use may be those typically used in the art.

Specific examples of photopolymerization initiators (e) include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propan-1-one}, IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl) methyl]-1-[4-(4-morpholinyl)phenyl]-1-butanone), DAROCUR TPO (2,4,6-trimethylbenzoyl-diphenyl-phosphine oxide), IRGACURE 819 (bis(2,4,6-trimethylbenzoyl)-phenyl phosphine oxide), IRGACURE 784 (bis(η5-2,4-cyclopentadien-1-yl)-bis(2,6-difluoro-3-(1H-pyrrol-1-yl)-phenyl) titanium), IRGACURE OXE 01 (1,2-octanedione,1-[4-(phenylthio)-,2-(O-benzoyloxime)]), IRGACURE OXE 02 (ethanone,1-[9-ethyl-6-(2-methylbenzoyl)-9H-carbazol-3-yl]-,1-(O-acetyloxime)), IRGACURE 754 (a mixture of oxy-phenyl acetic acid 2-[2-oxo-2-phenyl acetoxyethoxy] ethyl ester and oxy-phenyl acetic acid 2-(2-hydroxyethoxy) ethyl ester), Lucirin TPO, LR8893, and LR8970 (all of the above produced by BASF Japan Ltd.); DETX-S (2,4-diethyl thioxanthone) (produced by Nippon Kayaku Co., Ltd.); and Ebecryl P36 (produced by UCB).

The at least one photopolymerization initiator (e) for use may be a single photopolymerization initiator (e), or a combination of two or more photopolymerization initiators (e).

The thermal- and UV-curing adhesive composition according to the present invention comprises the at least one photopolymerization initiator (e) in an amount of preferably 0.5% by weight or more, and more preferably 1% by weight or more based on the entire composition, from the standpoint of excellent UV curability. The thermal- and UV-curing adhesive composition according to the present invention comprises the at least one photopolymerization initiator (e) in an amount of preferably 5% by weight or less, and more preferably 2% by weight or less based on the entire composition, from the standpoint of stability of the adhesiveness.

(f) Chain Transfer Agent

The thermal- and UV-curing adhesive composition according to the present invention may further comprise at least one chain transfer agent (f).

Chain transfer agents have an action of transferring the activity of a growing polymer chain to another molecule in a polymerization reaction. The action of a chain transfer agent in a polymerization reaction proportionally reduces the amount of relatively long molecular chains and the amount of relatively short molecular chains, thus narrowing the molecular weight distribution. This reduces the number of molecules that have a higher molecular weight, imparting ideal hardness to the composition obtained in the polymerization reaction.

The at least one chain transfer agent (f) is preferably a thiol. Specific examples of chain transfer agents (f) that are thiols include n-octyl mercaptan, n-dodecyl mercaptan, tert-dodecyl mercaptan, methyl mercaptan, ethyl mercaptan, tert-butyl mercaptan, benzyl mercaptan, tert-nonyl mercaptan, thioglycolic acid, isooctyl thioglycolate, 2-ethylhexyl thioglycolate, 1,8-dimercapto-3,5-dioxaoctane, dibenzylthiothiocarbonate, μ-mercaptopropionic acid, methyl-3-mercaptopropionate, 2-ethylhexyl-3-mercaptopropionate, n-octyl-3-mercaptopropioate, methoxy butyl-3-mercaptopropionate, stearyl-3-mercaptopropionate, 1,8-dimercapto-3,6-dioxaoctane, trimethylolpropanetris-3-mercaptopropionate, tris-[(3-mercaptopropionyloxy)-ethyl]-isocyanurate, pentaerythritol tetrakis-3-mercaptopropionate, pentaerythritol tetra(3-mercaptopropionate), tetraethylene glycol bis(3-mercaptopropionate), and dipentaerythritol hexa-3-mercaptopropionate.

The at least one chain transfer agent (f) for use may be a single chain transfer agent (f), or a combination of two or more chain transfer agents (f).

The thermal- and UV-curing adhesive composition according to the present invention comprises the at least one chain transfer agent (f) in an amount of 5% by weight or more, and more preferably 10% by weight or more based on the entire composition, from the standpoint of imparting higher hardness (i.e., sufficient toughness) to a cured product and/or reducing unevenness in the cured product. The thermal- and UV-curing adhesive composition according to the present invention comprises the at least one chain transfer agent (f) in an amount of 20% by weight or less, and more preferably 15% by weight or less based on the entire composition, from the standpoint of imparting an appropriate hardness (i.e., sufficient film tensile strength) to a cured product.

(g) Inorganic Filler

The thermal- and UV-curing adhesive composition according to the present invention may further comprise at least one inorganic filler (g). Adding at least one inorganic filler (g) enables the control of properties such as the coefficient of thermal expansion and rheology of the thermal- and UV-curing adhesive composition.

The at least one inorganic filler (g) includes silica filler, such as colloidal silica, hydrophobic silica, fine silica, and nanosilica; acrylic beads; glass beads; urethane beads; bentonite; acetylene black; and Ketjenblack.

The mean particle size of the at least one inorganic filler (g) (if the filler is not in the form of particles, the largest mean size) can be any size, and is preferably 0.01 μm or more from the standpoint of excellent handling of the thermal- and UV-curing adhesive composition. The mean particle size of the at least one inorganic filler (g) (if the filler is not in the form of particles, the largest mean size) is preferably 50 μm or less from the standpoint of homogeneous dispersion of the filler in the thermal- and UV-curing adhesive composition. In the present invention, the mean particle size of inorganic filler refers to a value as measured with a dynamic light scattering Nanotrac particle size analyzer.

Specific examples of the inorganic filler (g) include synthetic high-purity spherical silica SO-E5 or SO-E2 (produced by Admatechs Company Limited, mean particle size of SO-E5: 2 μm, mean particle size of SO-E2: 0.6 μm), silica FB7SDX (produced by Tatsumori Ltd., mean particle size: 10 μm), and silica TS-10-034P (produced by Micron, mean particle size: 20 μm).

The at least one inorganic filler (g) for use may be a single inorganic filler (g), or a combination of two or more inorganic fillers (g).

The thermal- and UV-curing adhesive composition according to the present invention comprises the at least one inorganic filler (g) in an amount of preferably 0.5% by weight or more, and more preferably 1% by weight or more based on the entire composition, from the standpoint of adhesive shrinkage percentage and thermal expansion control. The thermal- and UV-curing adhesive composition according to the present invention comprises the at least one inorganic filler (g) in an amount of preferably 20% by weight or less, and more preferably 10% by weight or less based on the entire composition, from the standpoint of elastic modulus and initial adhesion.

(h) Other Components

The thermal- and UV-curing adhesive composition according to the present invention may further comprise other components. The other components include, as adhesive adjuvants, various coupling agents, such as silane and titanate; and rheology adjusters, such as fumed silica.

Physical Properties

The thermal- and UV-curing adhesive composition according to the present invention has a storage modulus (25° C.) after curing by heat and UV of preferably 800 MPa or less, and more preferably 500 MPa or less. A storage modulus (25° C.) after curing by heat and UV within these ranges makes it unlikely for a mismatch in the coefficient of thermal expansion to occur between the surface of a substrate and the adhesive, even due to a thermal and/or physical impact.

Use

The thermal- and UV-curing adhesive composition according to the present invention is preferably used in assembling a camera module. More specifically, the thermal- and UV-curing adhesive composition according to the present invention is preferably used in assembling a camera module to adhere a lens holder to a substrate having an image sensor fixed thereon. The camera module can be any camera module; and is, for example, a compact camera module used for a smartphone or other such device.

EXAMPLES

Below, the present invention is described with reference to Examples. However, the present invention is not limited to these Examples. The value of each component in the table indicates a weight (g) unless the unit is specified.

Adhesive compositions of Comparative Examples 1 to 4 and Examples 1 to 3 were prepared by mixing the components in the composition ratios shown in Table 1. More specifically, acrylate monomers in which a heat-curing agent, a particulate rubber, a photopolymerization initiator, an inorganic filler, and a chain transfer agent were dissolved and one or more urethane acrylate oligomers were well dispersed using a three-roll mill. The obtained mixture and other additives were mixed with a planetary mixer, and vacuum degassing was further performed, thereby obtaining adhesive compositions.

The physical properties were evaluated as follows. Table 1 illustrates the evaluation results.

Storage Modulus Test

The formulated adhesive pastes were each cured to give a thickness of 1 mm under the following conditions: 500 mW/cm$^2$ for 4 seconds, and 80° C. for 60 minutes; thereby forming sheets. Each sheet was cut to a strip (width: 10 mm), and dynamic mechanical analysis (DMA) was performed in tensile mode to measure storage modulus E' at a temperature from −40° C. to 250° C.

Adhesion Test

FIG. 1 shows the procedure. The details are described below. Each adhesive composition in an amount (weight) of about 3.5 mg was dispensed on a ceramic substrate (15 mm×15 mm) to form a hollow square (5 mm×5 mm). Thereafter, a PC chip (7 mm×7 mm) was mounted thereon, and the thickness of the adhesive was adjusted to be 100 μm. Irradiation with a 365-nm LED was applied from four circumferential directions (500 mW/cm$^2$×4 seconds) for temporary curing. Thereafter, the samples were cured by heating at 80° C. for 60 minutes in a hot-air circulation oven, and subjected to measurement at a shear speed of 200 μm/s and a shear height of 120 μm with a 4000 Optima bondtester (produced by Dage).

Peeling Test

The procedure of the adhesion test described above was performed at 80° C. for 60 minutes until the adhesive was thermally cured. After a temperature cycle test was performed, whether the adhesive was peeled was examined by SEM.

A temperature and humidity test was performed at 85° C. and 85% RH for 250 hours.

The temperature cycle test was performed at −40 to 85° C., 250 cycles.

Example 1

The thermal- and UV-curing adhesive composition of Example 1 contained a polyether-based urethane acrylate oligomer with a Tg of 12° C. and a weight average molecular weight (Mw) of 5,000 and a polycarbonate-based urethane acrylate oligomer with a Tg of −27° C. and a weight average molecular weight (Mw) of 15,000 as the urethane acrylate oligomer.

Table 1 illustrates the evaluation results. The results indicate that curing of the thermal- and UV-curing adhesive composition of Example 1 by UV irradiation proceeded easily due to the presence of acrylate monomers. Because the cured product had a low elasticity and contained a suitable amount of particulate rubber, the cured product was naturally expected to be durable under physical impacts; additionally, the evaluation results indicate that the cured product also had durability under heat. Additionally, the results indicate that due to the presence of the polyamine curing agent having a primary amine or a secondary amine, the cured product had excellent initial adhesiveness during heat-curing, and excellent durability.

Comparative Example 1

The thermal- and UV-curing adhesive composition of Comparative Example 1, which contained only polyether-based urethane acrylate oligomers as the urethane acrylate oligomer, was not excellent in adhesiveness and durability, and peeled after the temperature cycle test.

Example 2

The thermal- and UV-curing adhesive composition of Example 2 contained only a polycarbonate-based urethane acrylate oligomer with a Tg of −27° C. and a weight average molecular weight ($M_w$) of 15,000 as the urethane acrylate oligomer.

Table 1 illustrates the evaluation results. The results indicate that curing of the thermal- and UV-curing adhesive composition of Example 2 by UV irradiation proceeded easily due to the presence of acrylate monomers. Because the cured product contained a suitable amount of particulate rubber, the cured product was durable under heat and physical impacts. Additionally, the results indicate that due to the presence of the polyamine curing agent having a primary amine or a secondary amine, the cured product had excellent initial adhesiveness during heat-curing, and excellent durability.

Comparative Example 2

Because the thermal- and UV-curing adhesive composition of Comparative Example 2 did not contain a sufficient amount of particulate rubber, the cured product did not have excellent durability under heat and physical impacts, and exhibited an overly high storage modulus. These results also led to peeling after the temperature cycle test.

Example 3

The thermal- and UV-curing adhesive composition of Example 3 contained a polyether-based urethane acrylate oligomer with a Tg of 12° C. and a weight average molecular weight ($M_w$) of 5,000 and a polycarbonate-based urethane acrylate oligomer with a Tg of −27° C. and a weight average molecular weight ($M_w$) of 15,000 as the urethane acrylate oligomer.

Table 1 illustrates the evaluation results. The results indicate that curing of the thermal- and UV-curing adhesive composition of Example 3 by UV irradiation proceeded easily due to the presence of acrylate monomers. Because the cured product contained a suitable amount of particulate rubber, the cured product was durable under heat and physical impacts. Additionally, the results indicate that due to the presence of the polyamine curing agent having a primary amine or a secondary amine, the cured product had excellent initial adhesiveness during heat-curing, and excellent durability.

Comparative Example 3

Although the thermal- and UV-curing adhesive composition of Comparative Example 3 contained a polycarbonate-based urethane acrylate oligomer and a polyether-based urethane acrylate oligomer as the urethane acrylate oligomer, the cured product was not excellent in durability under heat and physical impacts, and exhibited an overly high storage modulus due to a failure to form a sufficient soft segment structure because of its weight average molecular weight of about 3,000. These results also led to peeling after the temperature cycle test.

Comparative Example 4

The thermal- and UV-curing adhesive composition of Comparative Example 4 exhibited insufficient heat-curing due to the presence of the imidazole-based heat-curing agent as the heat-curing agent in the adhesive composition.

TABLE 1

| Type | Compound Name (Product Name) (Manufacturer) | Physical Properties | Comp. Ex. 1 | Comp. Ex. 2 | Comp. Ex. 3 | Comp. Ex. 4 | Ex. 1 | Ex. 2 | Ex. 3 |
|---|---|---|---|---|---|---|---|---|---|
| (a) Urethane Acrylate Oligomer | Polyether-Based: UN2700 (Negami Chemical Industrial Co., Ltd.) | $M_w$: 2,000; Tg: 28° C. | | | | 12 | | | |
| | Polyether-Based: UV6640B (Mitsubishi Chemical Corporation) | $M_w$: 5,000; Tg: 12° C. | 10 | 12 | | 6 | 6 | | 8 |
| | Polyether-Based: UN6202 (Negami Chemical Industrial Co., Ltd.) | $M_w$: 11,000; Tg: −55° C. | 10 | | | | | | |
| | Polycarbonate-Based: UV3310B (Mitsubishi Chemical Corporation) | $M_w$: 5,000; Tg: 22° C. | | 12 | 6 | | | | |
| | Polycarbonate-Based: UN9200A (Negami Chemical Industrial Co., Ltd.) | $M_w$: 15,000; Tg: −27° C. | | | 12 | | 12 | 18 | 14 |
| (b) Acrylate Monomer | Isobornyl Acrylate IBXA (Osaka Organic Chemical Industry Ltd.) | | 8 | 12 | 10 | 10 | 10 | 6 | 15 |
| | Tricyclodecanedimethanol Diacrylate A-DCP (Shin-Nakamura Chemical Co, Ltd.) | | 14 | 12 | 12 | 12 | 12 | 18 | 7 |
| (c) Rubber Powder | Dispersion of Core-Shell-Type Particulate Rubber (Butadiene) in Bisphenol A-type Epoxy Resin MX-154 (Kaneka Corporation) | | 208 wt % | 52 wt % | 208 wt % | 208 wt % | 208 wt % | 249.6 wt % | 164 wt % |
| (d) Polyamine Curing Agent | EH-5030S (Adeka Corporation) | Melting Point: 68° C. | 20 | 24 | 20 | | 22 | 20 | 20 |
| | 2-Phenylimidazole Curezol C17Z (Shikoku Chemicals Corporation) | Melting Point: 140° C. | | | | 22 | | | |
| (e) Photopolymerization Initiator | 1-Hydroxycyclohexyl-Phenylketone Omnirad 184 (IGM Resins) | | 1.5 | 1.5 | 1.5 | 1.5 | 1.5 | 1.5 | 1.5 |
| (f) Chain Transfer Agent | Trimethylolpropanetris(3-Mercaptopropionate) TMTP (Yodo Kagaku Co., Ltd.) | | | 10 | | 10 | 10 | 10 | 12 |
| | Pentaerythritol Tetrakis(3-Mercaptobutyrate) PE1 (Showa Denko K.K.) | | 10 | | 10 | | | | |
| (g) Inorganic Filler | SO-E5 (Admatechs Company Limited) | | 6.5 | 11.5 | 6.5 | 6.5 | 6.5 | 2.5 | 6.5 |
| | Storage Modulus (E') after Heat- and UV-Curing (MPa) | | 700 | 1200 | 1800 | Not Cured | 200 | 450 | 150 |
| Occurrence of Peeling | Immediately after Curing | | Peeled | Not Peeled | Not Peeled | Peeled | Not Peeled | Not Peeled | Not Peeled |
| | After Temperature Cycle Test (−40 to 85° C., 250 cycles) | | Peeled | Peeled | Peeled | Peeled | Not Peeled | Not Peeled | Not Peeled |

TABLE 1-continued

| Type | Compound Name (Product Name) (Manufacturer) | Physical Properties | Comp. Ex. 1 | Comp. Ex. 2 | Comp. Ex. 3 | Comp. Ex. 4 | Ex. 1 | Ex. 2 | Ex. 3 |
|---|---|---|---|---|---|---|---|---|---|
| | Adhesion after Temperature and Humidity Test (85° C./85 RH, 250 hours) (MPa) | | 11.0 | 16.5 | 17.8 | Not Cured | 12.5 | 14.5 | 13.0 |
| | Adhesion after Temperature Cycle Test (−40 to 85° C., 250 cycles) (MPa) | | 6.5 | 7.5 | 5.5 | Not Cured | 15.5 | 17.0 | 15.5 |

What is claimed is:

1. A thermal- and UV-curing adhesive composition, comprising
  (a) at least one urethane acrylate oligomer comprising at least one polycarbonate-based urethane acrylate oligomer,
  (b) at least one acrylate monomer,
  (c) at least one particulate rubber,
  (d) at least one polyamine curing agent having a primary amine and/or a secondary amine, and
  (e) at least one photopolymerization initiator,
  wherein the at least one urethane acrylate oligomer (a) has a weight average molecular weight of 4,000 or more, and
  the at least one particulate rubber (c) is present in an amount of 5% by weight or more in the entire composition.

2. The thermal- and UV-curing adhesive composition according to claim 1, wherein the at least one urethane acrylate oligomer (a) contains the at least one polycarbonate-based urethane acrylate oligomer in an amount of 50% by weight or more based on a total of the at least one urethane acrylate oligomer.

3. The thermal- and UV-curing adhesive composition according to claim 1, wherein the at least one particulate rubber (C) is a core-shell type particulate rubber.

4. The thermal- and UV-curing adhesive composition according to claim 1, further comprising
  (f) at least one chain transfer agent.

5. The thermal- and UV-curing adhesive composition according to claim 1, further comprising
  (g) at least one inorganic filler.

6. The thermal- and UV-curing adhesive composition according to claim 1, for use in assembling a camera module.

7. A thermal- and UV-curing adhesive composition used in assembling a camera module, the thermal- and UV-curing adhesive composition comprising
  (a) at least one urethane acrylate oligomer comprising at least one polycarbonate-based urethane acrylate oligomer,
  (b) at least one acrylate monomer,
  (c) at least one particulate rubber,
  (d) at least one polyamine curing agent having a primary amine and/or a secondary amine, and
  (e) at least one photopolymerization initiator,
  wherein the at least one urethane acrylate oligomer (a) has a weight average molecular weight of 4,000 or more, and
  the at least one particulate rubber (c) is present in an amount of 5% by weight or more in the entire composition.

8. A method of adhering a lens holder for a camera module to a camera module substrate having an image sensor fixed thereon,
  the method comprising adhering the lens holder to the substrate by using a thermal- and UV-curing adhesive composition, wherein the thermal- and UV-curing adhesive composition comprises
  (a) at least one urethane acrylate oligomer comprising at least one polycarbonate-based urethane acrylate oligomer,
  (b) at least one acrylate monomer,
  (c) at least one particulate rubber,
  (d) at least one polyamine curing agent having a primary amine and/or a secondary amine, and
  (e) at least one photopolymerization initiator,
  wherein the at least one urethane acrylate oligomer (a) has a weight average molecular weight of 4,000 or more, and
  the at least one particulate rubber (c) is present in an amount of 5% by weight or more in the entire composition.

* * * * *